(12) United States Patent
Diedrichs et al.

(10) Patent No.: US 9,362,837 B2
(45) Date of Patent: Jun. 7, 2016

(54) METHOD AND APPARATUS FOR FEEDING ELECTRICAL CURRENT INTO AN ELECTRICAL POWER SUPPLY SYSTEM

(71) Applicant: Wobben Properties GmbH, Aurich (DE)

(72) Inventors: Volker Diedrichs, Wardenburg (DE); Alfred Beekmann, Wiesmoor (DE)

(73) Assignee: WOBBEN PROPERTIES GMBH, Aurich (DE)

( * ) Notice: Subject to any disclaimer, the term of this patent is extended or adjusted under 35 U.S.C. 154(b) by 76 days.

(21) Appl. No.: 14/352,250

(22) PCT Filed: Oct. 10, 2012

(86) PCT No.: PCT/EP2012/070089
§ 371 (c)(1),
(2) Date: Apr. 16, 2014

(87) PCT Pub. No.: WO2013/057028
PCT Pub. Date: Apr. 25, 2013

(65) Prior Publication Data
US 2014/0254216 A1    Sep. 11, 2014

(30) Foreign Application Priority Data

Oct. 20, 2011  (DE) .......................... 10 2011 084 910

(51) Int. Cl.
*H02M 5/40* (2006.01)
*H02J 3/26* (2006.01)
(Continued)

(52) U.S. Cl.
CPC .. *H02M 5/40* (2013.01); *H02J 3/00* (2013.01);
*H02J 3/26* (2013.01); *H02J 3/386* (2013.01);
*Y02E 10/763* (2013.01); *Y02E 40/50* (2013.01)

(58) Field of Classification Search
CPC ..... H02M 7/5388; H02M 7/539; H02M 7/48; H02M 7/00; H02M 7/1552; H02M 7/1555; H02M 7/162; H02M 7/1623; H02M 7/1626; H02M 5/271; H02M 5/48; H02M 5/40; H02M 5/458; H02M 5/4585
USPC ........ 363/34, 97, 98, 131, 132; 323/237, 244, 323/246
See application file for complete search history.

(56) References Cited

U.S. PATENT DOCUMENTS

| | | | | |
|---|---|---|---|---|
| 6,056,782 A | * | 5/2000 | Qi ........................... | H02P 21/00 703/13 |
| 6,348,778 B1 | * | 2/2002 | Weinhold ................. | H02J 3/18 323/207 |

(Continued)

FOREIGN PATENT DOCUMENTS

| | | |
|---|---|---|
| CN | 101106273 A | 1/2008 |
| CN | 101534065 A | 9/2009 |

(Continued)

OTHER PUBLICATIONS

Gomis-Bellmunt et al., "Ride-Through Control of a Doubly Fed Induction Generator Under Unbalanced Voltage Sags," *IEEE Transactions on Energy Conversion* 23(4):1036-1045, Dec. 2008.

(Continued)

*Primary Examiner* — Timothy J Dole
*Assistant Examiner* — Htet Z Kyaw
(74) *Attorney, Agent, or Firm* — Seed IP Law Group PLLC (57) ABSTRACT

The invention relates to a method for feeding electrical current into an electrical, three-phase power supply system having a first phase, a second phase and a third phase with a first voltage, a second voltage and a third voltage at a power supply system frequency, comprising the steps of: measuring the first, second and third voltages, transforming the first, second and third voltages into a positive phase-sequence voltage system and a negative phase-sequence voltage system according to the method of symmetrical components, calculating a first desired current, a second desired current and a third desired current for feeding into the first, second and third phases of the power supply system, wherein the first, second and third desired currents are calculated on the basis of at least one value of the positive phase-sequence voltage system and/ or the negative phase-sequence voltage system.

15 Claims, 3 Drawing Sheets

(51) Int. Cl.
*H02J 3/38* (2006.01)
*H02J 3/00* (2006.01)

(56) References Cited

U.S. PATENT DOCUMENTS

| | | | | |
|---|---|---|---|---|
| 6,784,564 | B1* | 8/2004 | Wobben | F03D 7/0284 290/44 |
| 7,423,412 | B2 | 9/2008 | Weng et al. | |
| 7,525,824 | B2* | 4/2009 | Veenstra | H02J 3/38 322/28 |
| 7,978,445 | B2* | 7/2011 | Ritter | H02P 9/007 290/44 |
| 8,222,758 | B2* | 7/2012 | Arinaga | H02J 3/48 290/44 |
| 8,378,514 | B2* | 2/2013 | Fortmann | H02J 3/40 290/40 B |
| 8,400,003 | B2* | 3/2013 | Letas | F03D 9/002 290/44 |
| 8,699,245 | B2* | 4/2014 | Bucker | H02J 3/26 363/37 |
| 8,981,755 | B2 | 3/2015 | Beekmann et al. | |
| 2004/0100247 | A1 | 5/2004 | Matsumoto et al. | |
| 2009/0281740 | A1* | 11/2009 | Stoupis | G01R 31/024 702/58 |
| 2010/0052322 | A1* | 3/2010 | Fortmann | F03D 7/0272 290/44 |
| 2010/0276930 | A1* | 11/2010 | Fortmann | F03D 9/003 290/44 |
| 2011/0134669 | A1* | 6/2011 | Yuzurihara | H02M 7/219 363/89 |
| 2013/0264824 | A1* | 10/2013 | Gupta | F03D 7/0284 290/44 |

FOREIGN PATENT DOCUMENTS

| | | |
|---|---|---|
| CN | 101557190 A | 10/2009 |
| CN | 102055205 A | 5/2011 |
| DE | 197 56 777 A1 | 7/1999 |
| DE | 100 22 974 A1 | 11/2001 |
| DE | 101 19 624 A1 | 11/2002 |
| DE | 10 2007 005 165 A1 | 8/2007 |
| DE | 10 2009 031 017 A1 | 2/2011 |
| JP | 2004-180363 A | 6/2004 |
| JP | 2006025549 A | 1/2006 |
| WO | 02/086315 A1 | 10/2002 |
| WO | 2010/028689 A1 | 3/2010 |
| WO | 2011/000754 A1 | 1/2011 |

OTHER PUBLICATIONS

Zhou et al., "Operation of Grid-Connected DFIG Under Unbalanced Grid Voltage Condition," *IEEE Transactions on Energy Conversion* 24(1):240-246, Mar. 2009.

Kang et. al: "The Compensating Unbalanced Source Voltages for Unified Active Power Filter System"; The Transactions of Korean Institute of Electrical Engineers vol. 56, No. 4 (Apr. 2007) (with English abstract); 8 pgs.

Singh, B. et al., "Selective Compensation of Power-Quality Problems Through Active Power Filter by Current Decomposition," IEEE Transactions on Power Delivery, vol. 23, No. 2, Apr. 2008; pp. 792-799.

* cited by examiner

METHOD AND APPARATUS FOR FEEDING ELECTRICAL CURRENT INTO AN ELECTRICAL POWER SUPPLY SYSTEM

BACKGROUND

1. Technical Field

The present invention concerns a method and a apparatus for feeding electric current into an electric three-phase network. The present invention also concerns a wind power installation which is adapted to feed electric current into a three-phase network.

2. Description of the Related Art

Methods and apparatuses for feeding electric current into an electric three-phase network such as for example the European integrated network or into a part thereof are generally known. Large-scale power stations use for that purpose a synchronous generator connected directly to the electric network. For that purpose the synchronous generator is operating at a suitable rotary speed which is precisely matched to the frequency of the electric network. Depending on the respective structural configuration of the synchronous generator the rotary speed is for example 1500 revolutions per minute in the case of a four-pole synchronous generator connected to a network involving a frequency of 50 Hz. If disturbances occur in the network such as for example an asymmetric loading on the network in which for example one of the three network phases is more heavily loaded, that has a direct effect on the current delivered by the synchronous generator. In that case the physically governed characteristics of the synchronous generator can at least partially contribute to making the network symmetrical again. The nature and fashion of such a contribution from the synchronous generator however cannot basically be influenced because of the rigid coupling to the network.

Wind power installations were still connected passively to the network in the 1990's in the sense that they feed as much energy into the network as is possible at the respective current moment in time in consideration of the prevailing wind conditions. It was recognized for the first time at the end of the 1990's that wind power installations can also make a contribution to electrically supporting the network. Thus for example German patent application DE 100 22 974 A1 describes a method in which wind power installations can change and in particular throttle their feed of power into the network in dependence on the network frequency. DE 101 19 624 A1 proposes that in the event of a network disturbance, more specifically in particular in the case of a short-circuit, a wind power installation restricts the current which it feeds into the network instead of being disconnected from the network in order also thereby to achieve network support. WO 02/086315 A1 describes a method for network support by a wind power installation, which adjusts a phase angle of the fed-in current in dependence on the network voltage and thus feeds apparent power into the network in dependence on voltage in order thereby to support the network. DE 197 56 777 A1 also concerns a method of network support by means of a wind power installation, in which the wind power installation possibly reduces the power to be fed into the network, in dependence on the network voltage, in order thereby in particular to avoid disconnection from the network, in order also thereby to achieve support for the network by a wind power installation.

Wind power installations are becoming increasingly important. They are also increasingly gaining in importance in regard to network support. The above-described network support measures—which can also be referred to as pioneering steps—are however still capable in that respect of being improved in so far as network asymmetries are taken into account.

In that respect taking account of network asymmetries raises some problems. Firstly problems are involved in rapidly and accurately detecting network asymmetries. In addition in the case of detection of asymmetries, the problem arises of targetedly compensating for same, which is not possible or is only limitedly possible with a strongly coupled synchronous generator. The same problems occur in systems which do not use a synchronous generator but simulate same in terms of behavior.

As state of the art attention is also to be directed generally to WO 2010/028689 A1 relating to a wind power installation with a double-fed asynchronous machine.

BRIEF SUMMARY

One or more embodiments may be directed to resolving or reducing at least one of the above-mentioned problems. One embodiment seeks to provide a solution in which current is to be fed deliberately asymmetrically into the network in order to counter asymmetries present in the network. The invention seeks at least to provide an alternative solution.

According to one embodiment of the invention there is proposed a method according to claim 1.

Accordingly there is proposed a method of feeding electric current into an electric three-phase network having a first, a second and a third phase with a first, second and third voltage at a network frequency. In that respect the method is based on a three-phase system involving a frequency, namely the network frequency, in which each phase has its own voltage which can differ from the voltages of the other phases. The method therefore takes account in particular also of an asymmetric three-phase system.

In a step the first, second and third voltages are measured and the voltages are transformed into a voltage positive sequence and a voltage negative sequence using the method of symmetrical components. Thus, the three-phase voltage system can be described in a simple and general fashion in spite of taking account of asymmetries. It is assumed that only three lines which are usually referred to as L1, L2 and L3 carry current and thus a zero sequence is not present or is not needed for description purposes, but a description by voltage positive sequence and voltage negative sequence is sufficient.

The method further involves calculation of a first, second and third target current for feeding into the first, second and third phase respectively of the network. It is pointed out that the provision and feed of such a first, second and third current—the three currents can also be referred to together as a three-phase current—differs fundamentally and substantially from the generation of a three-phase current for actuation of a device like an electric motor. Thus, when a current is fed into an electric network, there is usually not a direct and in particular deterministic reaction to the feed into the network, as would be the case in the event of a well-known consumer. Admittedly the electric network also reacts to the current which is respectively fed in, but nonetheless such a reaction is not comparable to that of a directly present and clearly identifiable consumer such as for example an electric motor.

Calculation of the first, second and third target currents is effected in dependence on at least one value of the voltage positive sequence and/or the voltage negative sequence. Thus it is firstly proposed that in the event of a feed into the three-phase network asymmetries of the network are to be taken into consideration and the three currents to be fed in are to be correspondingly calculated. Therefore, to take account of the network asymmetries, it is proposed that the target currents be calculated in dependence on the voltage positive sequence and the voltage negative sequence respectively. In that way it is possible to react in targeted fashion to corresponding asymmetries in the network.

In contrast to conventional large-scale power stations which provide for the network feed by way of a star with a synchronous generator coupled to the network there is now proposed specifically targeted calculation of the target currents in dependence on the asymmetry or taking same into consideration.

This therefore involves taking account of any asymmetries of the network voltage, which has consequences in terms of calculation of the current to be fed. Thus the positive sequence and/or negative sequence of the network voltage acts on the currents to be fed in.

In an embodiment it is proposed that electric currents are produced by means of a frequency converter corresponding to the first, second and third target currents for feeding into the three-phase voltage network and are fed thereinto. That therefore basically directly involves production of the currents by a converter, as can be implemented for example by pulse width modulation. For that purpose the energy to be fed into the network can be provided in a DC voltage intermediate circuit from which pulse width modulation is implemented in order to respectively generate an oscillating, in particular sinusoidal current from the DC voltage signal of the DC voltage intermediate circuit.

Preferably for that purpose, in particular for the DC voltage intermediate circuit specified by way of example, the electric energy is provided by a wind power installation and the AC voltage energy produced is converted by means of a rectifier into energy with a DC voltage. That is intended in particular to make it possible to use wind power installations or wind parks with a plurality of wind power installations for stabilizing the network and in particular for stabilizing an asymmetric network. At least preferably the electric energy of wind power installations is fed into the network in such a way that any asymmetry involved is not increased and the network condition is therefore not worsened.

In an embodiment the method is characterized in that to calculate the target currents a calculation phase angle is adopted as the basis and the calculation phase angle is determined in dependence on a detection of a network fault, in particular using a determination filter or a filter block. In that case the calculation phase angle is determined from a detected phase angle of one of the network voltages if no network fault was detected. Otherwise, if a network fault was detected or is to be assumed, it is proposed that the calculation phase angle is determined in another way, in particular from a phase angle of the voltage positive sequence, and/or that the calculation phase angle is determined using a predetermined network frequency.

Accordingly determination or calculation of the target currents is not directly based on a phase angle detected upon measurement of the three-phase voltage, but a specific phase angle is calculated, which forms the basis for calculation of the target currents and which for that reason is identified as the calculation phase angle. The calculation phase angle should be distinguished for example by a high level of accuracy and/or low noise. The calculation phase angle can be determined for example by way of a determination filter or filter block. That determination filter or filter block can be for example in the form of a state observer. Calculation of the phase angle can be effected for example in the manner described in German laid-open application DE 10 2009 031 017 A1 in connection with FIG. 4 therein. In particular the operation of determining the currents can be effected in the way that determination of the phase angle $\phi_1$ from the detected phase angle $\phi_N$ is described therein.

The calculation phase angle is preferably determined from a phase angle of the voltage positive sequence if a network fault was detected. Here in particular the arrangement is switched over to that other source for determining the phase angle, which can also be implemented in the form of a software solution. The use of the phase angle of the voltage positive sequence is proposed for that purpose. At least at the beginning of a network fault which occurs it may be possible for the phase angle of the voltage positive sequence to deliver a reliable value or an at least sufficiently reliable value for the phase angle. Frequently a network fault also involves problems in terms of voltage measurement. The reason for that can be for example that the voltage cannot be measured, it can be poorly measured or in part it cannot be measured or can be poorly measured. Another problem can be that measurement or detection of the voltage of the three-phase system is based on conditions which possibly no longer prevail in the network fault situation.

Alternatively or additionally it is proposed that in the case of a network fault a predetermined network frequency is used for calculating the calculation phase angle. In the simplest case a fixed frequency such as for example the nominal frequency, that is to say for example exactly 50 Hz or exactly 60 Hz is constantly predetermined and the phase angle is determined therefrom, in the simplest case by way of integration. Preferably the use of a predetermined frequency is combined with the use of a phase angle from the voltage positive sequence. Such a combination can be effected in such a way that the operation of determining the voltage positive sequence and in that case also the voltage negative sequence itself uses a predetermined frequency, in which case the phase angle of the voltage positive sequence is correspondingly also determined and is thus determined using the predetermined frequency.

It is further preferably proposed that for calculating the target currents, in particular if a network fault is detected, reference is made to the voltage positive sequence, in particular to the phase angle of the voltage positive sequence. An important aspect when feeding electric current into an AC voltage network, in particular into a three-phase AC voltage network is the phase angle with which it is fed into the network. Predetermining an phase angle of the three-phase target current or a phase angle for each target current presupposes knowledge which is as precise as possible of the network phase angle or knowledge which is as precise as possible is desirable. Therefore a problem in terms of feeding the three-phase current into the network is imprecise knowledge of the network phase angle, which for example can occur when there is a network fault. Equally—possibly with the additional problem of inaccurate measurement—an asymmetric network is problematical because problems can already occur in establishing a suitable phase angle for such an asymmetric situation.

Referencing to the phase angle of the voltage positive sequence component proposes here a solution which addresses those problems. Determining the positive sequence component which includes the step of determining the phase angle of the positive sequence component affords a comparatively stable value which at the same time takes account of any asymmetries of the three-phase network. Referencing of the operation of determining the target currents thereto, that is to say taking the phase angle of the positive sequence or a phase angle of the voltage as calculated therefrom as the basis, thus permits suitable target current presetting even for non-ideal conditions in the three-phase network.

Particularly if there are ideal conditions in the three-phase network, it is possible to switch over to using the detected phase angle of one of the network voltages and vice-versa. Switching over in that way is preferably effected at the input side to a filter, in particular at the input side of the determination filter or the filter block. A corresponding switching-over jump can also be filtered by using a determination filter or filter block. If for example a calculation phase angle is determined from the detected phase angle of a network voltage or a phase angle of the voltage positive sequence, as is described in FIG. 4 of German laid-open application DE 10 2009 031 017 A1 then the determination filter or filter block has a second-order transfer characteristic. A switching-over pulse or jump at the input of such a determination filter has correspondingly slight effects at the output of the filter or filter block and thus there are only few or negligible problems upon further use for referencing purposes in calculating the target currents.

As a further embodiment there is proposed a method characterized in that transformation of the first, second and third voltages into a voltage positive sequence and a voltage negative sequence includes transformation of the first, second and third voltages by means of a discrete Fourier transformation (DFT), wherein in particular the discrete Fourier transformation is effected online and only over half a period duration. From the measured voltage values of the three phases the discrete Fourier transformation determines complex voltage values for the three-phases, that is to say a voltage in respect of amplitude and phase for each of the three phase voltages. To be able also to take account of non-ideal conditions of the three-phase network, very fast detection of the network situation, in particular fast detection of changes in the voltages in the network, can sometimes be important or even of crucial significance for matched current feed into the network. When using the positive sequence component and the negative sequence component, in particular upon referencing to the phase angle of the positive sequence component of the voltage, a crucial change in the network state should also be reflected in those components as quickly as possible. Accordingly the discrete Fourier transformation should also work as quickly as possible.

Usually a Fourier transformation and thus also a discrete Fourier transformation is based on at least one entire period duration. That forms the underlying basis and is also essential for correct implementation of a Fourier transformation. It was however now realized that it may be sufficient to base it on half a period duration. Accordingly the Fourier transformation, namely the discrete Fourier transformation, was adapted thereto.

Preferably the transformation is effected online, namely in the sense that at each measurement point the values of the three voltages are recorded and pass into the discrete Fourier transformation which is also performed at each measurement time. Thus recorded measurement values also act immediately on the result of the discrete Fourier transformation. The respective currently measured measurement values are incorporated as new values and the remaining, already previously measured values of the current half-wave are also involved. A change in the situation in the network will thus have first effects with the first measurement value, after measurement of half a period duration they will have acted completely on the result of the discrete Fourier transformation.

Thus a discrete Fourier transformation for half a period duration means that the respective current measurement values are recorded in the manner of a sliding value as far as the measurement values which are back by half a period duration, and they are incorporated into the discrete Fourier transformation step.

Thus the duration, after which new measurement values act completely on the result of the discrete Fourier transformation, can be halved in relation to a conventional discrete Fourier transformation over an entire period length. Accordingly the discrete Fourier transformation will lead to a result twice as quickly or any detection times can be halved.

In an embodiment there is proposed a method characterized in that transformation of the first, second and third voltages into a voltage positive sequence and a voltage negative sequence uses a predetermined frequency instead of measurement of a currently prevailing network frequency. Such a predetermined frequency can be for example the nominal frequency of the network, therefore in particular 50 Hz in the case of the European integrated network or for example 60 Hz in the USA. The predetermined frequency can however also be established in some other fashion, either as another fixed value or by a calculation specification or the network frequency used is taken from a model.

This embodiment is based on the notion that the transformation can be influenced, in particular improved, in particular in the sense of stabilizing the transformation, by presetting a network frequency. Such a procedure can be used precisely when there is a network fault and the actual network frequency is difficult or inaccurate to measure or cannot be measured at all.

Preferably the value of the network frequency of a measurement time which is further back can be used as the predetermined network frequency. In this case the transformation is oriented to the last, in particular reliably measurable value of the actual network frequency.

A preferred configuration proposes that the method is characterized in that the target currents are predetermined in accordance with the method of symmetrical components by way of a current positive sequence and a current negative sequence. In particular in that respect the positive sequence is taken into account by a complex positive sequence current component in respect of amount and phase and the negative sequence is taken into account by a complex negative sequence current component in respect of amount and phase.

The method of symmetrical components in known as the method of detecting an existing asymmetric three-phase system, that is to say it is basically known as a measurement method. Here it is now proposed that the currents are to be predetermined based on analysis in accordance with the method of symmetrical components. That presetting can be effected in particular in such a way that two complex currents, namely the positive sequence current component and the negative sequence current component, are predetermined. On the basis thereof the three individual target currents are then respectively predetermined in respect of amount and phase.

In an embodiment therefore calculation of the first, second and third current target values is effected in dependence on a value of a voltage positive sequence and/or a voltage negative sequence of the three-phase network voltage present, wherein specific predetermination of the three-phase current to be produced is effected by way of predetermination of positive sequence current components and negative sequence current components. This case is based on two completely different procedures or steps.

In the first step the basic starting point is the actual state of a three-phase system, namely the three-phase voltage system, and that actual state is reproduced using the method of symmetrical components.

The second step involves the target currents, wherein the procedure involved is entirely different, namely insofar as predetermination is effected in the image domain. In particular a desired degree of asymmetry can be predetermined by way of the positive sequence component and the negative sequence component. Likewise the phase angle can be predetermined in that image domain, that is to say the representation domain, by the use of positive and negative sequence components. On the basis thereof the actual target currents, that is to say the target currents in the time domain, are then determined and finally suitably converted.

Preferably the target currents are predetermined by way of a positive and negative sequence. Upon conversion of those target currents as individual target currents in the time domain they are preferably referenced to a phase angle of the voltage positive sequence, that is to say the positive sequence that is to be attributed to the actual state of the voltages in the three-phase network.

Preferably the target currents are calculated in dependence on the current positive sequence or the positive sequence current component respectively and when a network fault is assumed to occur they are additionally calculated in dependence on the current negative sequence or the negative sequence current component respectively. Thus in particular a three-phase target current can be predetermined by way of positive sequence and negative sequence current components, whereas both components are used in dependence on the network situation, namely in the case of a network fault, or only the positive sequence component is used if a network fault is not to be assumed. Network problems like network faults and/or network asymmetries can be taken into account thereby.

In that respect, particularly when there is a symmetrical fault-free network, there is proposed an efficient feed method which in regard to the target currents only takes account of the positive sequence current component which basically reflects the symmetrical network. If the network is completely symmetrical in the mathematical sense the counter-current component becomes zero and accordingly the counter-current component will be small if slight asymmetries can be assumed to be involved. It is thus proposed that in suitable cases it is possible to dispense with consideration of the counter-current component. For the sake of completeness it is pointed out that the term counter-current component denotes the negative sequence current component and the term co-current denotes the positive sequence current component. The network can be identified as a voltage network to emphasize that the network operates on a voltage basis.

In a preferred embodiment the method is characterized in that the current positive sequence or the positive sequence current component and the current negative sequence or the negative sequence current component are determined in dependence on predetermination of an active power component of the positive sequence, a predetermination of a reactive power component of the positive sequence and/or a predetermination of a quotient of the magnitude of the negative sequence current component in relation to the magnitude of the positive sequence current component.

An active power component and a reactive power component can be predetermined thereby in a simple fashion. Preferably the counter-current component is used to counteract an asymmetry of the electric three-phase network. Independently thereof an active and reactive power component of the current to be fed into the network can be predetermined by way of the positive sequence current component. That is particularly advantageous and meaningful when the feed of the target currents is referenced to the phase angle of the voltage positive sequence. In that way it is possible to feed substantially a symmetrical current component into the network, adapted to the symmetrical voltage component, and at the same time to take account of asymmetries both in the detection operation and also in the feed into the network.

The operation of predetermining a degree of asymmetry or a parameter characteristic in relation to a degree of asymmetry can be easily effected when predetermining the three-phase target current by way of positive and negative sequence components, if the quotient thereof, namely the quotient of negative sequence component to positive sequence component, is established. Alternatively, instead of a fixed value it is also possible to predetermine an upper limit for a degree of asymmetry.

Preferably the negative sequence current component is set and/or varied independently of the positive sequence current component. Thus for example firstly on the one hand the power which is substantially to be fed into the network, in particular the active power, can be predetermined in respect of amplitude by way of the positive sequence current component. Accordingly in that way—expressed in simplified terms—the total current is predetermined in a first approximation in respect of its amplitude. When predetermining the complex positive sequence current component division of active and reactive power or active and reactive power component is also effected by way of the phase angle, as was described above.

Firstly on the one hand an asymmetry can be predetermined by way of the counter-current component. In particular it is possible to predetermine an asymmetry component in a specifically targeted fashion, in particular in respect of quality and quantity, for at least partially compensating for an asymmetry in electric voltage networks. Correspondingly the use of positive sequence current component and negative sequence current component affords a high degree of freedom in predetermining the three-phase current to be fed into the network. The magnitude of the positive sequence current component is in particular also substantially adjusted by the available power of the wind power installation and in that respect in dependence on the prevailing wind conditions.

Preferably the method is carried out online. In particular preferably all method steps are carried out online. It is possible in that way to react as quickly as possible to any network changes and the feed of the electric current can be suitably adapted. In particular the described embodiments are adapted to such online implementation, as is the case in particular for transformation of the detected three-phase voltage system into positive and negative voltage sequence components. In particular the described discrete Fourier transformation which is adapted to the use of only a half period duration permits such online implementation of the method of detecting and feeding the electric current.

According to one embodiment of the invention there is also proposed a wind power installation which uses a method of feeding electric current into an electric three-phase voltage network of at least one of the described embodiments.

According to one embodiment of the invention there is also proposed a wind park comprising a plurality of such wind power installations. Such a wind park, with modern wind power installations of today, can assume orders of magnitude which permit a significant influence on the electric network, in particular support for the electric network and also quality improvement of the current in the electric network.

In that respect the term wind park is used to denote an array of a plurality of wind power installations which interact with each other and in particular use one or more common feeding points for feeding electric current into an electric network.

BRIEF DESCRIPTION OF THE SEVERAL VIEWS OF THE DRAWINGS

The invention is described way of example hereinafter by means of embodiments with reference to the accompanying Figures.

DETAILED DESCRIPTION

Figure 1:
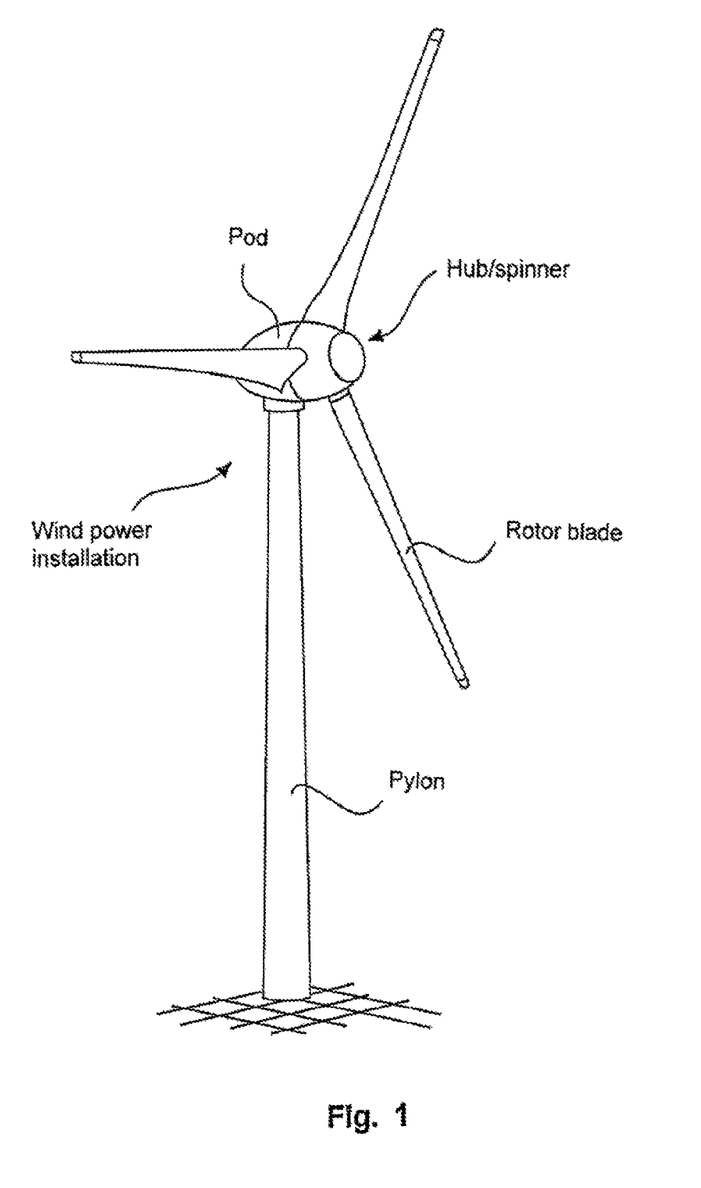
FIG. 1 shows a wind power installation.

FIG. 1 shows a wind power installation which inter alia implements a method according to one embodiment of the invention and for that purpose has at least one frequency converter with appropriate actuation in order thereby to feed into an electric three-phase network.

Figure 2:
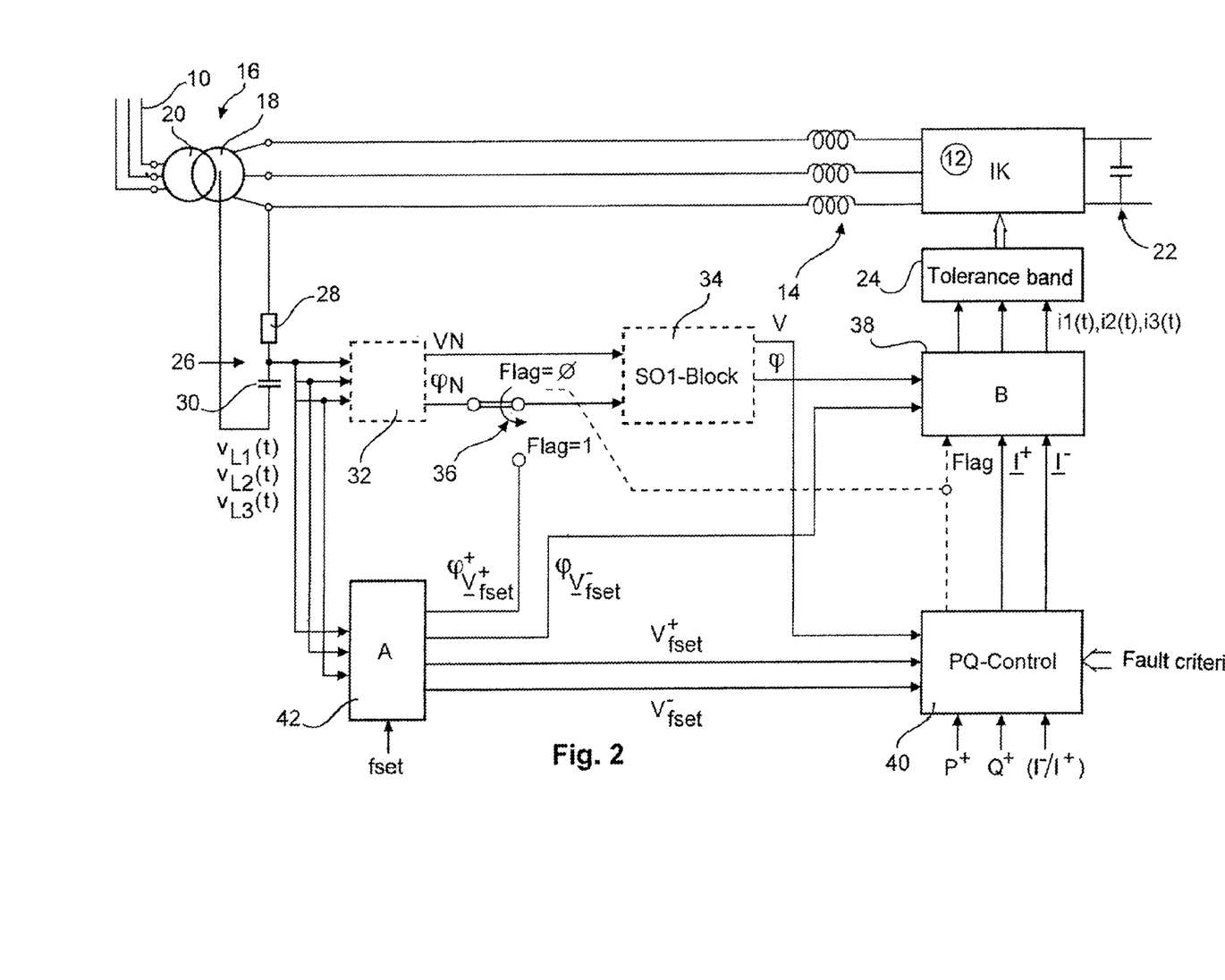
FIG. 2 shows an overview diagram to illustrate an embodiment of the method according to the invention.

The structure of an embodiment of the invention as shown in FIG. 2 is based on a three-phase network 10 into which an inverter 12 feeds by way of output chokes 14 and by way of a transformer 16. The transformer 16 has a primary side 18 and a secondary side 20. The transformer 16 is connected to the three-phase network 10 by way of a secondary side 20 and the primary side 18 is connected to the inverter 12 by way of the output chokes 14.

The inverter 12 is supplied by way of a DC voltage intermediate circuit 22 with a direct current or a DC voltage, preferably the DC voltage intermediate circuit 22 can be fed by a wind power installation or a generator of a wind power installation, in which electric current generated by the generator is rectified by means of a rectifier and fed into that DC voltage intermediate circuit 22.

The inverter 12 thus produces from the direct current or the DC voltage of the DC voltage intermediate circuit 22 a three-phase alternating current which has three individual currents $i_1$, $i_2$ and $i_3$. The three-phase alternating current or the three individual currents are produced by means of pulse width modulation. The pulses required for that purpose are predetermined by means of a tolerance band control in accordance with the corresponding tolerance band block 24. For that purpose the tolerance band block 24 receives the currents $i_1$, $i_2$ and $i_3$ to be controlled, as reference or target values.

Calculation of the switching times based on the current target values is effected by the tolerance band block 24 in basically known fashion in accordance with a tolerance band method. In accordance therewith—expressed in simplified terms—a switching operation of a corresponding semiconductor switch for producing or ending a pulse is triggered when a current actual value breaks out of a tolerance band, that is to say it exceeds the respective target value by more than a tolerance value or falls below the respective current value by more than that or another tolerance value. In principle it is also possible to use other methods instead of this tolerance band method.

One aspect of the present invention is the operation of determining those target values $i_1$, $i_2$ and $i_3$ and/or the variation in the three target currents. In that respect the variation in the target currents is also to be evaluated or interpreted in conjunction with the network behavior.

To feed current into the network as needed—instead of the term network it is also possible to use the synonymous term grid network—the arrangement has the measurement filter 26 which measures the voltages of the three phases of the network and for that purpose has a respective measurement resistor 28 and a measurement capacitance 30, that is to say a capacitor. Those components are provided for each phase and as shown in FIG. 2 measurement of the voltages is effected at the primary side 18 of the transformer 16. Alternatively, measurement can also be implemented on the secondary side 20 of the transformer 16 or also at other locations in the network 10. For performing measurements in respect of a three-phase network attention is also directed to German patent application DE 10 2009 031 017 A1 which discloses in FIG. 3 thereof a measurement filter corresponding to the measurement filter 26 of this FIG. 2.

The measured voltages $v_{L1}(t)$, $v_{L2}(t)$ and $v_{L3}(t)$ are inputted into the transformation block 32 which calculates a transformation at a time of the voltage values measured in polar co-ordinates into a complex-value parameter with magnitude and phase, namely the network voltage $V_N$ as magnitude and the angle $\phi_N$ as phase. The phase angle relates to the first voltage. The calculation operation can be carried out as follows, wherein $v_1$, $v_2$ and $v_3$ respectively represent the instantaneous voltage value of the voltages $v_{L1}(t)$, $v_{L2}(t)$ and $v_{L3}(t)$:

$$\vec{v} = \left[v_1 + v_2 \exp\left(j\frac{2}{3}\pi\right) + v_3 \exp\left(j\frac{4}{3}\pi\right)\right]$$

$$V_N = \sqrt{\frac{2}{3}} \sqrt{(\text{real}(\vec{v}))^2 + (\text{imag}(\vec{v}))^2}$$

$$\varphi_M = \arctan(\text{imag}(\vec{v})/\text{real}(\vec{v}))$$

Those equations and further description relating thereto are moreover to be found in above-mentioned German laid-open application DE 10 2009 031 017 A1.

The network voltage $V_N$ determined in that way and the network phase angle $\phi_N$ determined in that way are inputted into a state observer block 34 which can also be referred as the SO1 block. The input of the state observer block 34 for the phase angle also has a state switch 36 which can be switched over in dependence on any fault situation in the network in such a way that, instead of the network phase angle $\phi_N$, as the output of the transformation block 32, another phase angle can be inputted into the state observer block 34, which will be further described hereinafter.

The state observer block 34 outputs as the observed state parameter the estimated parameter V as an estimated effective value of the network voltage and the estimated phase angle $\phi$ as the estimated value of the network phase angle.

A possible configuration of the transformation block 32 together with the state observer block 34 can also be found in the above-mentioned German laid-open application DE 10 2009 031 017 A1. In that respect attention is directed to FIG. 4 together with the related description. The transformation block 32 can for example be of such a configuration as shown at block No 6 in FIG. 4 of that laid-open application. The state observer block 34 can be for example of a configuration as shown by block F1 with blocks 10 and 12.

The estimated phase angle $\phi$ is inputted directly into a decision block 38. The decision block 38 calculates target values for the three-phase currents $i_1(t)$, $i_2(t)$ and $i_3(t)$. Those target currents form the input for the tolerance band block 24 and thus the basis for modulation which is carried out in the inverter 12. The estimated phase angle $\phi$ is an important basic parameter for that purpose because a feed of alternating currents into a running alternating current network is possible only with knowledge of the respective instantaneous phase angle in the network. Nonetheless the decision block 38 takes account at least indirectly of further items of information, namely the estimated network voltage V, any predetermination values of active and/or reactive power to be fed into the network and the information as to whether a—relevant—network fault is present or could be present. Those items of information ultimately pass by way of a PQ control block 40 into the decision block 38. The decision block 38 performs calculation or determination of the target currents $i_1(t)$, $i_2(t)$ and $i_3(t)$, wherein the underlying calculation depends on whether a network fault was or was not detected. For that reason the term decision block was also adopted for that block 38. The internal calculations in the decision block 38 are also set forth below. Further items of information relating to the PQ control block are also set forth hereinafter.

The decision block 38 uses—and this is also set forth in detail hereinafter—a breakdown into a positive sequence and a negative sequence. In corresponding fashion the positive sequence current or the positive sequence current component $\underline{I}^+$ and the negative sequence current or the negative sequence current component $\underline{I}^-$ respectively forms an input parameter of the decision block 38. The decision block 38 is based—at any event if no network fault is present—on the positive sequence which generally in this application is characterized by a superscript plus sign whereas the negative sequence component is characterized by a superscript minus sign. In other words the system in FIG. 2 and in particular the calculation in the decision block 38 is referenced to the positive sequence component.

Breakdown of the measured voltages $V_1(t)$, $V_2(t)$ and $V_3(t)$ into a positive sequence or a negative sequence is performed in the calculation block 42 which for that purpose has a predetermined frequency $f_{set}$. In the simplest case that frequency can be the assumed network frequency, that is to say for example 50 Hz in the European integrated network or 60 Hz in the USA network. It is however also possible to adopt other values, possibly also variable values.

In addition as input signals the decision block 38 receives at least also the phase angle $\phi_{Vfset}$ of the negative sequence in accordance with the transformation of the three-phase voltage in the calculation block 42. In addition the decision block 38 receives as input a flag as an indicator as to whether a network fault is or is not assumed to be present. The calculations performed in the decision block 38 in respect of the three target currents $i_1(t)$, $i_2(t)$ and $i_3(t)$ are carried out in dependence on the value for the flag.

If the flag is 0, that is to say there is no fault situation, the three currents are calculated as follows:

$$i_1(t) = \sqrt{2}I^+ \cos(\phi + \phi_{\underline{I}^+})$$

$$i_2(t) = \sqrt{2}I^+ \cos(\phi + \phi_{\underline{I}^+} + 2/3\pi)$$

$$i_3(t) = \sqrt{2}I^+ \cos(\phi + \phi_{\underline{I}^+} + 4/3\pi)$$

The respective instantaneous value of the respective target current is thus based on the magnitude of the positive sequence target current $\underline{I}^+$, the estimated network phase angle $\phi$ and the phase angle of the target current of the positive sequence $\phi_{\underline{I}^+}$. The estimated network phase angle $\phi$ specifies in that respect the respectively current absolute phase angle of the network voltage, with respect to the first phase. The phase angle of the positive sequence current component $\phi_{\underline{I}^+}$ specifies the phase angle of the current of the positive sequence in relation to the phase angle $\phi$ of the network voltage.

If the flag assumes the value 1 (flag=1) it is assumed that there is a network fault. Such network faults or network disturbances include:
- the loss of angle stability,
- the occurrence of network islanding,
- the occurrence of a three-phase short-circuit, and
- the occurrence of a two-pole short-circuit.

Further information relating to the nature of such network disturbances is also to be found in above-mentioned laid-open application DE 10 2009 031 017 A1. The occurrence of such network faults can in particular also have the result that detected network states, in particular the phase angle $\phi$ and the voltage level V were wrongly detected and/or are unsuitable for or are poorly suited to orientation for the currents to be fed into the network. Calculation in the decision block 38 for the situation where a network fault is assumed to occur is thus based—speaking generally—more greatly on parameters ascertained in the calculation block 42 and thus more greatly on the predetermined frequency $f_{set}$. That is intended only to serve for general explanation and in that respect as a precaution it is pointed out that calculations in the calculation block 42 about determining the positive sequence component $\underline{I}^+$ and the negative sequence component $\underline{I}^-$ are involved in the decision block 38 and are thus also of relevance for calculation in the decision block 38 without the assumption of a network fault.

Upon the assumption of a network fault (flag=1), after calculation or determination of the target currents $i_1(t)$, $i_2(t)$ and $i_3(t)$ the following three steps are proposed. The following calculation steps—and also the above-mentioned calculation in the situation without a network fault—are effected for that time at which a respective instantaneous value is transferred to the tolerance band block 24 for the three target currents $i_1(t)$, $i_2(t)$ and $i_3(t)$.

In the first step a cos-component $\underline{I}^{+c}$ and $\underline{I}^{-c}$ and a sin-component $\underline{I}^{+s}$ and $\underline{I}^{-s}$ are respectively calculated for the positive sequence and the negative sequence as follows:

$$i^{+c} = \sqrt{2}I^+ \cos(\phi + \phi_{\underline{I}^+})$$

$$i^{+s} = \sqrt{2}I^+ \cos(\phi + \phi_{\underline{I}^+})$$

$$i^{-c} = \sqrt{2}I^- \cos(\phi_{V_{fset}} + \phi_{\underline{I}^-})$$

$$i^{-s} = \sqrt{2}(-I^-)\sin(\phi_{V_{fset}} + \phi_{\underline{I}^-})$$

In the above equation system of the first step, $\underline{I}^+$ denotes the magnitude of the positive sequence component and correspondingly $\underline{I}^-$ denotes the magnitude of the negative sequence component. $\phi_{\underline{I}^+}$ and $\phi_{\underline{I}^-}$ respectively denote the phase angle of the positive sequence and the negative sequence respectively. In accordance with the FIG. 2 structure those angles are not expressly passed to the decision block 38, but are inherent elements of the complex positive sequence component $\underline{I}^+$ and the complex negative sequence component $\underline{I}^-$. The phase angle of the negative system component of the voltage, as is determined in the calculation block 42, which will be further described hereinafter, is directly passed to the decision block 38.

It is to be observed that a breakdown of the three-phase network voltages into a positive sequence component and a negative sequence component is implemented in the calculation block 42, more specifically based on the fundamentally known method of symmetrical components. That method of symmetrical components also forms the basis for the operation of determining a positive system component and a negative system component of the current in accordance with the PQ control block 40. Those two current components are passed as complex values to the decision block 38. While that breakdown of the network voltage in accordance with the calculation block 42 in the ideal case represents a representation of the actual state of the network voltages the division into positive and negative sequences for the current in PQ control block 40 includes a representation of the desired current to be fed into the network or in preparation for the desired current to be fed into the network. Thus that representation of the positive and the negative sequences for the current can include for example a desired phase shift of the current relative to the voltage to feed a desired reactive power component into the network.

Taking the cos- and sin-components calculated in that way for the positive sequence and also for the negative sequence $\underline{I}^{+c}, \underline{I}^{-c}, \underline{I}^{+s}, \underline{I}^{-s}$ an auxiliary current value i* and an auxiliary angle value φ* are now calculated in the second step as follows:

$$i^* = \sqrt{(i^{+c} + i^{-c})^2 + (i^{+s} + i^{-s})^2}$$

$$\varphi^* = \arctan\left[\frac{i^{+s} + i^{-s}}{i^{+c} + i^{-c}}\right]$$

Finally in the third step for each of the target currents $i_1(t)$, $i_2(t)$ and $i_3(t)$ a respective value for the moment in time in question is calculated from the auxiliary current value i* and the auxiliary angle value φ*, as follows:

$$i_1(t) = i^* \cos(\varphi^*)$$

$$i_2(t) = i^* \cos(\varphi^* + 2/3\pi)$$

$$i_3(t) = i^* \cos(\varphi^* + 4/3\pi)$$

It is to be noted that in this third step three individual values are calculated for the three target currents $i_1(t)$, $i_2(t)$ and $i_3(t)$. That is effected for each calculation time, that is to say a plurality of times for each period duration. It is further to be noted that at each moment in time the auxiliary current value i* and the auxiliary angle value φ* change. Depending on the respective change in those values therefore the result of the calculation of that step three must not lead to a symmetrical three-phase current system although the three equations of the calculation in step three differ only in an angle offset of 2/3π and 4/3π respectively. Nonetheless therefore an asymmetric predetermination of the three current and thus an asymmetric feed is just as possible as a symmetrical feed. The same moreover also applies in substance for the above-represented calculation of the target currents $i_1(t)$, $i_2(t)$ and $i_3(t)$. In the decision block 38 if a network fault is not assumed to apply, therefore if flag=0.

Figure 3:
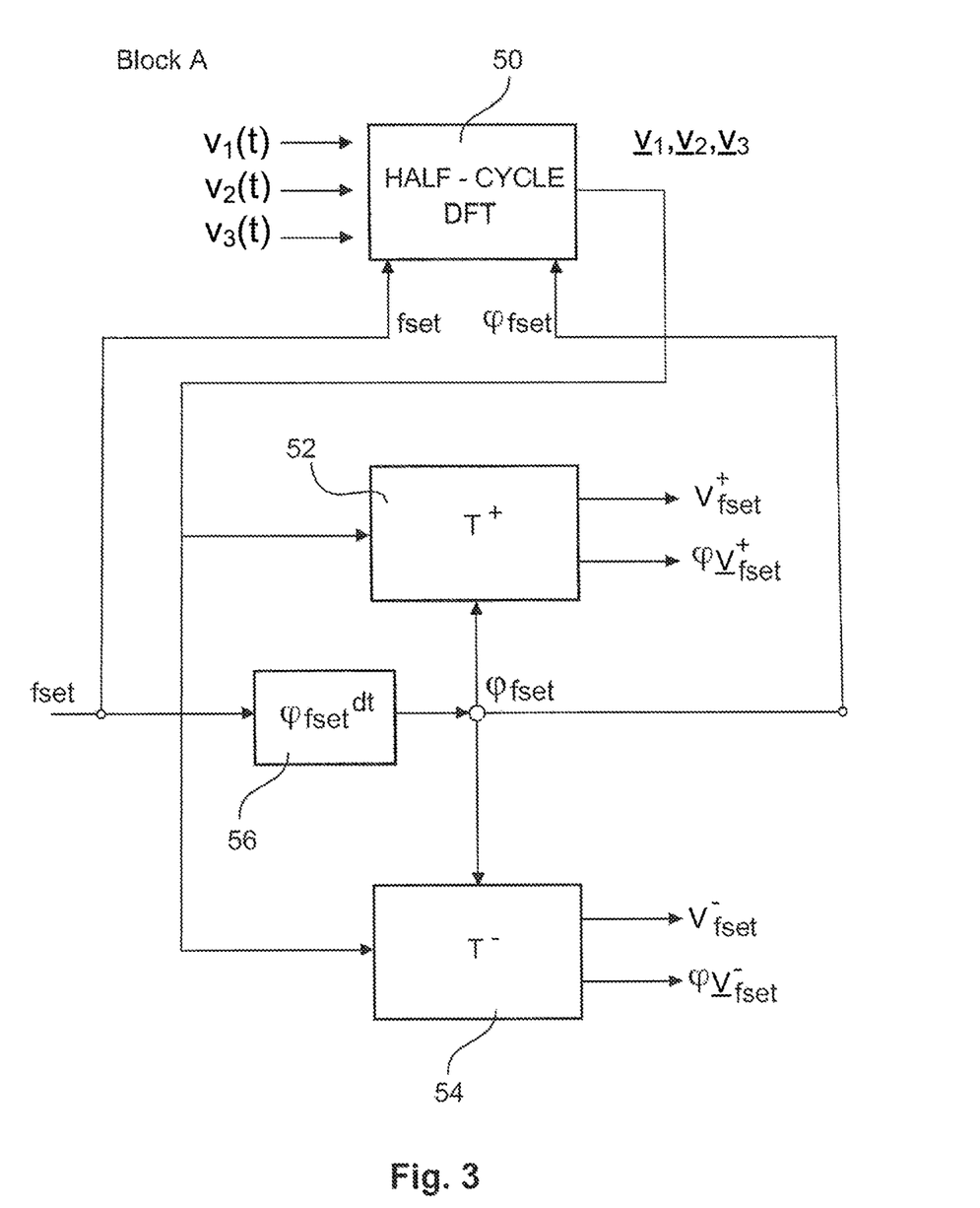
FIG. 3 shows in detail a calculation block of FIG. 2.

FIG. 3 shows details of the calculation block 42 of the overall structure shown in FIG. 2. In accordance therewith the measured network voltages $v_1(t)$, $v_2(t)$ and $v_3(t)$ are detected and therefrom transformed or converted into complex voltages $\underline{V}_1, \underline{V}_2$ and $\underline{V}_3$ in the transformation block 50 identified as the half-cycle DFT. In the ideal case those complex voltages $\underline{V}_1, \underline{V}_2$ and $\underline{V}_3$ are only a different representation for the measured voltages $v_1(t)$, $v_2(t)$ and $v_3(t)$ and presuppose a sinusoidal configuration of a fixed frequency.

The three complex voltages $\underline{V}_1, \underline{V}$, and $\underline{V}_t$ therefore define a three-phase voltage system which however can be asymmetric. Breakdown of that three-phase system is accordingly effected into positive sequence component and a negative sequence component, based on the method of symmetrical components. The positive system component, namely its magnitude $V^+_{fset}$ and phase $\phi_{V^+_{fset}}$, is calculated in the positive sequence transformation block 52, and the negative sequence component, namely its magnitude $V^-_{fset}$ and phase $\phi_{V^-_{fset}}$ is calculated in the negative sequence transformation block 54. Both the half-cycle DFT calculation block 50 which can also be simply identified as the DFT transformation block and also the positive sequence transformation block 52 and the negative sequence transformation block 54 use for their calculation a set frequency $f_{set}$ which is inputted from the exterior and the angle $\phi_{fset}$ calculated therefrom. The predetermined or fixed angle $\phi_{fset}$ is afforded by integration of the predetermined or set frequency $f_{set}$ in the integration block 56.

Calculation of a positive sequence which can also be referred to as a positive sequence component and a negative sequence which can also be referred to as a negative sequence component is basically known from the theory of the method of symmetrical components. In that respect an asymmetric three-phase system of so-called phasors is divided into positive sequence, negative sequence and zero sequence. The positive sequence has the same direction of rotation as the underlying three-phase system whereas the negative sequence has an opposite direction to that original system. The positive sequence considered in itself and also the negative sequence considered in itself are each symmetrical in themselves. The zero sequence denotes a sequence in which all phasors involve the same direction and the same length. That zero sequence compensates for any deviation from zero of the addition of the original system. In the present case however—which is also because a neutral conductor is not present or is not taken into consideration—a zero sequence is not considered and is thus also not calculated, but only the positive sequence or the positive sequence component and the negative sequence or the negative sequence component.

Calculation of a positive sequence and a negative sequence from a three-phase asymmetric system is known to the man skilled in the art from text books and in that respect is not described in greater detail here.

Calculation of the complex voltage values $\underline{V}_1, \underline{V}_2$ and $\underline{V}_3$ is based on the basically known method of discrete Fourier transformation, referred to for brevity as DFT. In a discrete Fourier transformation a periodic signal is described in unique, that is to say reversible, fashion as superpositioning of a direct component, a fundamental oscillation and its harmonic. In the simplest case neither a direct component nor a harmonic is present or such components can be disregarded. In that case the corresponding descriptive components are omitted and a description of the signal in terms of magnitude, phase and frequency is exclusively employed. To perform such a discrete Fourier transformation a period duration of the periodic signal is to be detected. If a sinusoidal signal at a frequency 50 Hz is involved, as is the case with the electric voltage in the European integrated network—in substance that can be applied to a 60 Hz network as for example in the USA—then a period length is T/=1/f=1/50 Hz=20 ms. For a discrete Fourier transformation of the voltage signal of a 50 Hz voltage network therefore at least 20 ms is required. That time can be very long if the aim is for fast reaction to network faults in the network.

It is now proposed that only half a period length of the signal to be transformed is used. In the present case therefore of each voltage signal $V_1(t)$, $V_2(t)$ and $V_3(t)$ only half a period length is taken into account in each case. The result of this modified DFT which is also referred to here as half-cycle DFT is calculated in the transformation block 50 and outputted. Accordingly for each of the three voltage phases there is a voltage magnitude $V_i$ and a voltage phase $\phi_{Vi}$. The variable "i" can assume the value 1, 2 or 3 and accordingly denotes the 1st, 2nd and 3rd phase respectively.

$$V_i^c = K_c \int_0^{\frac{1}{2f_{set}}} v_i(t) * \cos(2\pi f_{set} * t) \, dt$$

-continued $$V_i^s = K_s \cdot \int_0^{\frac{1}{2f_{set}}} v_i(t) * \sin(2\pi f_{set} * t) \, dt$$

$$\varphi_{V_i} = \arctan\left(\frac{V_i^s}{V_i^c}\right)$$

$$V_i = \sqrt{(V_i^c)^2 + (V_i^s)^2}$$

That calculation is implemented for each phase, which is indicated by the index i which thus assumes the value 1, 2 or 3 according to the respective phase. Thus firstly a first voltage component $V_i'$ and a second voltage component $V_i''$ are calculated by means of the respectively specified integral. More specifically therefore a given integral of 0 to $$\frac{1}{2f_{set}}$$

is calculated. In that case $$\frac{1}{2f_{set}} = \frac{1}{2}T$$

and thus the given integral is calculated over half a period duration T. A scaling factor $K_c$ is also to be taken into account for the first voltage component $V_i^{c*}$ and correspondingly a scaling factor $K_s$ is to be taken into consideration for the second voltage component $V_i^s$, wherein those two scaling factors may also be identical. The two integrals represented can be calculated in different ways. For example implementation of a discrete calculation is also considered, in particular having regard to the fact that the respective voltage values $v_i(t)$ are present in a process computer and thus also in the transformation block 50 in the form of sampling values. Concrete implementation of such a similar integral formation for example on a process computer is familiar to a person of ordinary skill in the art. Moreover it is pointed out that the first voltage component $V_i^c$ and the second voltage component $V_i^s$ could be interpreted as an imaginary part and a real part.

In calculation of the two integrals for the first and second voltage components it is to be noted that the voltage values of $v_i(t)$ which are back by up to half a period duration are respectively taken into consideration. In the case of a sinusoidal voltage signal at a frequency of 50 Hz—to give a practical example—that involves half a period duration at 10 ms. Accordingly changes approximately after 10 ms are completely detected by that modified DFT or half-cycle DFT. The first effects however already have such changes when they occur. The transformation or calculation of the complex voltage values, namely $\underline{V}_1$, $\underline{V}_2$ and $\underline{V}_3$, proposed in the transformation block 50 in FIG. 3, can thus be carried out very quickly. The sampling frequency which the transformation block 50 uses can be for example 5 kHz and therefore there is a calculation value every 200 μs. That 200 μs is thus the duration after which—in this example—the first effect of a change in the network voltage is reflected in the calculated complex voltage values.

Accordingly after approximately that time there is also an effect in respect of the values of the positive and negative sequences, that is to say for $V^+_{fset}$, $\phi_{Vfset}$, $V^-_{fset}$ and $\phi_{V^-_{fset}}$.

FIG. 2 shows the further use of the components calculated in the calculation block 42 for the positive sequence and the negative sequence as follows:

The state switch 36 is switched in dependence on a fault signal, namely the flag. If flag=0, that is to say if it is assumed that there is no network fault, the state switch 36 is switched in such a way that the network phase angle $\phi_N$ which is calculated in the transformation block 32 is used as an input parameter for the state observer block 34.

If however it is assumed that there is a network fault, then flag=1 and the state switch 36 switches over so that the phase angle $\phi^+_{V_{fset}}$, that is to say the calculated phase angle of the positive sequence, forms the input, namely the input angle, of the state observer block 34. In this case therefore the phase angle of the positive sequence forms the basis for the state observer block 34. That can also be interpreted such that at any event reference is made in respect of the phase angle to the positive sequence.

The phase angle of the negative sequence $\phi^-_{V_{fset}}$ forms an input signal of the decision block 38. That angle is required in the decision block 38 for the situation where it is assumed that there is a network fault, as was already explained hereinbefore in connection with the calculations or processes in the decision block 38. In that respect, upon the assumption of a network fault, the decision block 38 links the phase angles of the positive sequence and the negative sequence and in that respect takes account of an asymmetry in the network voltages. As explained in this case the phase angle of the negative sequence $\phi^-_{V_{fset}}$ is effected directly and the phase angle of the positive sequence $\phi^+_{V_{fset}}$ is effected indirectly by way of state observation of the state observation block 34.

The voltage values of the positive sequence $V^+_{fset}$ and of the negative sequence $V^-_{fset}$ which were calculated in the calculation block 42 are used in the PQ-control block 40. The basically desired current which is to be fed into the network is determined in the PQ-control block, more specifically in respect of all three currents to be fed in. The determining operation which can also be referred to as the presetting step accordingly outputs a complex positive sequence current $\underline{I}^+$ and a complex negative sequence current $\underline{I}^-$ respectively. Therefore at least the possibility is assumed to exist, namely that the three-phase current is asymmetric and therefore the description in accordance with the method of symmetrical components is used. The PQ-control block 40 admittedly uses the voltage amplitudes $V^+_{fset}$ and $V^-_{fset}$ which were produced in the calculation block 42 and issue, but for calculation of the positive sequence and negative sequence current components $\underline{I}^+$ and $\underline{I}^-$ it implements a dedicated calculation, namely breakdown into positive and negative sequences.

The calculation of that predetermined current can take account of various presettings, namely the active power component to be fed in, in particular the active power component of the positive sequence $P^+$ and the reactive power component to be fed in, namely in particular the active power component of the positive sequence $Q^+$. In addition it is possible to take account of a ratio of the magnitudes of the current of the negative sequence $I^-$ to the current of the positive sequence $I^+$, namely $I^-/I^+$. That quotient is a measurement of the degree of asymmetry of the three-phase system which is described by that positive sequence component and negative sequence component.

In addition the PQ-control block 40 takes account of fault criteria, from which a network fault can be deduced and generates the above-described flag which assumes the value 0 if it is assumed that there is no network fault and assumes the value 1 if it is assumed that a network fault is present. Such fault criteria can be for example a great change in frequency, the failure of a phase or also the failure of or a great reduction in the amplitude of all phases. The fault criterion can however also be a direct signal which is already the result of an external evaluation or which is afforded by a network operator and possibly in that respect also specifies the nature of the network fault.

The PQ-block can be implemented in different ways. It can for example simultaneously take account of $V^+_{fset}$ and $V^-_{fset}$ and V. For example $V^+_{fset}$ and $V^-_{fset}$, which are basically synthetic values, and V which stands for the real voltage, do not have to be correctly reproduced. Thus $V^+_{fset}$ and $V^-_{fset}$ can for example have a frequency fault. The one or the other or both values is used in dependence on the specific situation.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of feeding electric current into an electric three-phase network comprising first, second and third phases with first, second and third voltages at a network frequency, the method comprising:
   measuring the first, second and third voltages,
   transforming the first, second and third voltages into a voltage positive sequence and a voltage negative sequence using a method of symmetrical components,
   calculating a first, second and third target currents for feeding into the first, second and third phases, respectively, of the electric three-phase network, wherein calculation of the first, second and third target currents is effected in dependence on at least one value of the voltage positive sequence and the voltage negative sequence.

2. The method according to claim 1 wherein electric energy is produced by a wind power installation and fed into the electric three-phase network.

3. The method according to claim 1 wherein electric currents corresponding to the first, second and third target currents for feeding into the electric three-phase network are produced by a frequency converter and fed into the electric three-phase network.

4. The method according to claim 1 wherein calculating the first, second and third target currents is based on a calculation phase angle that is determined in dependence on detection of a network fault using a determination filter or filter block, wherein
   the calculation phase angle is determined from a detected phase angle of one of the network voltages when no network fault is detected; and
   the calculation phase angle is determined from a phase angle of the voltage positive sequence using a predetermined network frequency when a network fault is detected.

5. The method according to claim 1 wherein calculating the target currents reference is made to the voltage positive sequence, including the phase angle of the voltage positive sequence.

6. The method according to claim 1 wherein transforming the first, second and third voltages into the voltage positive sequence and the voltage negative sequence includes transformation of the first, second and third voltages by a discrete Fourier transformation, wherein the discrete Fourier transformation is effected online and over half a period duration.

7. The method according to claim 1 wherein transforming the first, second and third voltages into the voltage positive sequence and the voltage negative sequence uses a predetermined frequency instead of using the currently prevailing network frequency.

8. The method according to claim 7 wherein the predetermined frequency is one of a value of the network frequency of an earlier measurement time, a nominal value of the network frequency, and an externally predetermined value.

9. The method according to claim 1 wherein the first, second and third target currents are predetermined using the method of symmetrical components by way of a current positive sequence and a current negative sequence, and wherein the positive sequence is taken into consideration by a complex positive sequence current component with respect to magnitude and phase and the negative sequence is taken into consideration by a complex negative sequence current component with respect to magnitude and phase.

10. The method according to claim 9 wherein the first, second and third target currents are calculated in dependence on the current positive sequence or the positive sequence current component and assumes a network fault.

11. The method according to claim 9 wherein the current positive sequence or the positive sequence current component and the current negative sequence or the negative sequence current component is determined in dependence on at least one of:
   a presetting of an active power component of the positive sequence,
   a presetting of a reactive power component of the positive sequence, and
   a presetting of a quotient of the magnitude of the negative sequence current component in relation to the magnitude of the positive sequence current component.

12. The method according to claim 9 wherein the negative sequence current component is set or varied independently of the positive sequence current component.

13. The method according to claim 1 wherein the method is carried out online.

14. A wind power installation which uses a method according to claim 1 for feeding electric current into the electric three-phase network.

15. A wind park comprising a plurality of wind power installations with at least one wind power installation according to claim 14.

* * * * *